(12) United States Patent
Usikov et al.

(10) Patent No.: US 9,710,934 B1
(45) Date of Patent: Jul. 18, 2017

(54) APPARATUS AND METHOD FOR SHADOW GENERATION OF EMBEDDED OBJECTS

(71) Applicant: SONY CORPORATION, Tokyo (JP)

(72) Inventors: Daniel Usikov, Newark, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 14/982,611

(22) Filed: Dec. 29, 2015

(51) Int. Cl.
  *G06T 11/00* (2006.01)
  *G06T 15/60* (2006.01)
  *G06T 5/30* (2006.01)

(52) U.S. Cl.
  CPC .............. *G06T 11/001* (2013.01); *G06T 5/30* (2013.01); *G06T 15/60* (2013.01); *A63F 2300/6646* (2013.01)

(58) Field of Classification Search
  CPC ......... G06T 15/50; G06T 15/60; G06T 13/40; A63F 2300/6646; A63F 2300/66
  See application file for complete search history.

(56) References Cited

U.S. PATENT DOCUMENTS

| 6,349,113 | B1 | 2/2002 | Mech et al. | |
|---|---|---|---|---|
| 2001/0001767 | A1* | 5/2001 | Miyamoto | A63F 13/10 463/30 |
| 2002/0022517 | A1* | 2/2002 | Tokuyama | A63F 13/10 463/32 |
| 2004/0032906 | A1 | 2/2004 | Lillig | |
| 2004/0056859 | A1* | 3/2004 | Ohba | G06T 15/50 345/426 |
| 2004/0208385 | A1 | 10/2004 | Jiang | |
| 2004/0239670 | A1* | 12/2004 | Marks | A63F 13/10 345/419 |
| 2007/0046665 | A1 | 3/2007 | Nakagawa et al. | |
| 2007/0098290 | A1 | 5/2007 | Wells | |
| 2008/0219555 | A1 | 9/2008 | Wiedemann et al. | |
| 2008/0231631 | A1* | 9/2008 | Matsumura | G06T 15/60 345/419 |
| 2008/0305713 | A1 | 12/2008 | Cortenraad | |
| 2009/0154807 | A1 | 6/2009 | Rossato et al. | |

(Continued)

OTHER PUBLICATIONS

Gibson, et al., "Rapid Shadow Generation in Real-World Lighting Environments", The Eurographics Association 2003, 12 pages.

(Continued)

*Primary Examiner* — Jeffery A Brier
(74) *Attorney, Agent, or Firm* — Chip Law Group

(57) ABSTRACT

Various aspects of an apparatus and a method to generate a shadow of an object embedded in a target image are disclosed herein. The method includes generation of an object mask of the embedded object in the target image. The object mask is categorized into a first category or a second category based on a pre-determined set of rules. Based on the categorization, a shadow of the object in the target image is generated. The generation of the shadow comprises dilating the categorized object mask by a predetermined multiplication factor when the categorized object mask corresponds to the first category. The generation of the shadow further comprises determination of depth information of the categorized object mask at a pre-determined height when the categorized object mask corresponds to the second category.

23 Claims, 11 Drawing Sheets

(56) References Cited

U.S. PATENT DOCUMENTS

| | | | |
|---|---|---|---|
| 2010/0134688 A1* | 6/2010 | Moriwake | G06K 9/00228 |
| | | | 348/586 |
| 2010/0182315 A1* | 7/2010 | Asami | A63F 13/00 |
| | | | 345/426 |
| 2011/0050864 A1 | 3/2011 | Bond | |
| 2011/0050901 A1 | 3/2011 | Oya | |
| 2011/0211754 A1 | 9/2011 | Litvak et al. | |
| 2012/0120054 A1 | 5/2012 | Sandrew et al. | |
| 2014/0192054 A1* | 7/2014 | Yoo | G06T 15/60 |
| | | | 345/426 |
| 2015/0009216 A1* | 1/2015 | Watanabe | G06T 15/60 |
| | | | 345/426 |

OTHER PUBLICATIONS

International Search Report and Written Opinion of PCT Application No. PCT/US2016/066164, issued on Apr. 13, 2017, 12 pages.

* cited by examiner

APPARATUS AND METHOD FOR SHADOW GENERATION OF EMBEDDED OBJECTS

CROSS-REFERENCE TO RELATED APPLICATIONS/INCORPORATION BY REFERENCE

None.

FIELD

Various embodiments of the disclosure relate to an apparatus and a method for shadow generation. More specifically, various embodiments of the disclosure relate to an apparatus and a method for shadow generation of objects embedded in a target image.

BACKGROUND

The past decade has witnessed various advancements in the field of image processing that have extended the functionalities of various imaging devices and associated applications, such as digital image editing applications. A typical image editing application may encompass various techniques, such as manipulation, enhancement, and/or transformation, to modify a target image that may originally comprise a set of objects. In certain scenarios, another set of objects may be cut/pasted or copy/pasted from multiple source images and embedded into the target image. There may be different aspects, such as associated shadows, of the embedded set of objects that may require adjustment so that the embedded set of objects appears natural in the target image. For example, the embedded set of objects, in the absence of the associated shadows, may look as if "flying in the air", and hence may appear unnatural. Thus, the associated shadows may be required to be appropriately generated for the embedded set of objects in the target image so that the embedded set of objects is "grounded", and appear more natural.

For the embedded set of objects, the generation of the shadows may be different based on the type of light source in the scene of the target image. For example, when the type of light source is, "single point source", the generated shadows may be single and sharp in appearance. In another example, when the type of light source is, "multiple point sources", the generated shadows may be multiple and sharp in appearance. However, it may be difficult to generate shadows for single or multiple light sources as the location of the light source(s) is required to be precisely determined in such cases. Thus, a simplified, efficient, and automated technique may be desirable to generate high-quality shadows of the embedded objects regardless of the type of light source in the scene of the target object.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for shadow generation of an object embedded in a target image are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
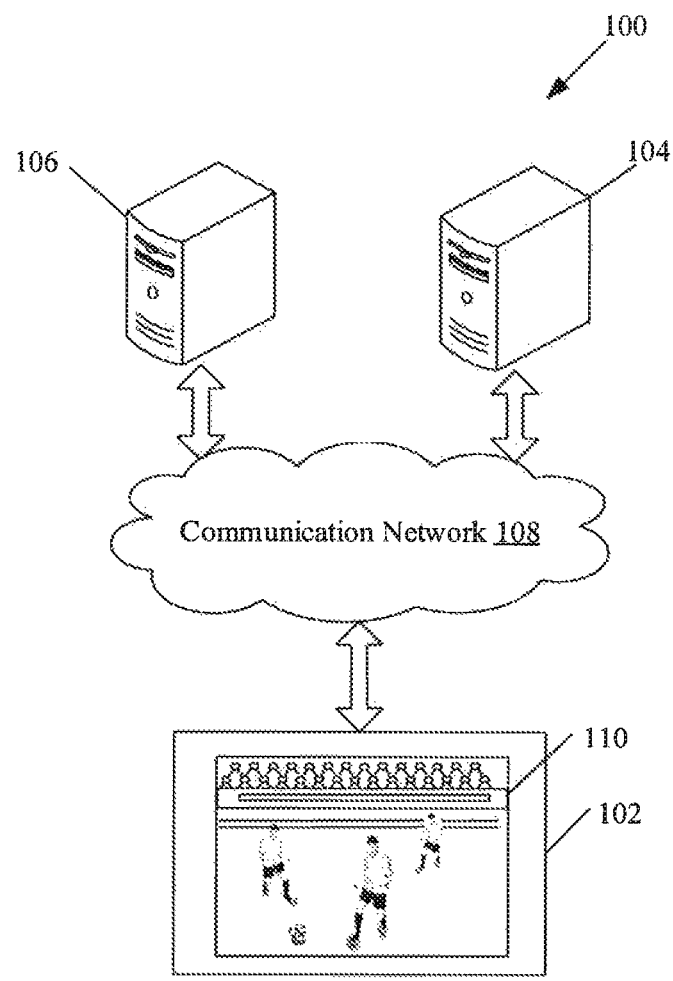
FIG. 1 is a block diagram that illustrates a network environment to implement the disclosed apparatus and method for shadow generation of objects embedded in a target image, in accordance with an embodiment of the disclosure.

Various implementations may be found in an apparatus and/or method for shadow generation of one or more objects embedded in an image. Exemplary aspects of the disclosure may comprise a method for shadow generation that includes generation of an object mask of an object in a target image. The object mask may be categorized into a first category or a second category, based on a pre-determined set of rules. Further, a shadow of the object in the target image may be generated, based on the categorization of the object mask. The generation of the shadow may comprise dilating the categorized object mask by a predetermined multiplication factor when the categorized object mask corresponds to the first category. The generation of the shadow may comprise determination of depth information of the categorized object mask at a pre-determined height when the categorized object mask corresponds to the second category. In accordance with an embodiment, the object may be extracted from a source image. The extracted object may be embedded at a pre-determined location in the target image.

In accordance with an embodiment, the first category may correspond to a category that comprises sitting objects. In accordance with an embodiment, the second category may correspond to a category that comprises standing objects. The count of extremities of the object mask may be determined based on a count of connected regions at the pre-determined height of the object mask. In accordance with an embodiment, the object mask may be categorized into the first category when a ratio of a width of the object mask (at the pre-determined height) to a height of the object mask is equal to or greater than a first pre-defined value and the count of extremities at the pre-determined height of the object mask is less than a second pre-defined value. The object mask may be categorized into the second category when the ratio of the width of the object mask (at the pre-determined height) to the height of the object mask is less than the first pre-defined value. In accordance with an embodiment, the object mask may be categorized into the second category when the ratio of the width of the object mask (at the pre-determined height) to the height of the object mask is equal to or greater than the first pre-defined value and the count of extremities of the object mask is equal to or greater than the second pre-defined value.

In accordance with an embodiment, the pre-determined set of rules may be determined, based on a ratio of a width of the object mask at the pre-determined height and a height of the object mask, and/or the count of the extremities of the object mask. In accordance with an embodiment, the shadow of the object in the target image may be generated based on an ambient source of light.

In accordance with an embodiment, the shadow generation of one or more sitting objects may include generation of the object mask of an object in the target image. The object may be categorized as a sitting object. A bottom contour of the object mask may be determined between a left-most contour point and a right-most contour point. The determined bottom contour may be further dilated by the pre-determined multiplication factor. Further, the shadow of the object in the target image may be generated based on the dilation. In accordance with an embodiment, a contour of the object mask may be generated. Further, the dilated bottom contour, between vertical lines that may be in contact with the left-most contour point and the right-most contour point, may be determined. In accordance with an embodiment, a brightness of the generated shadow may be controlled based on a distance of each pixel in the dilated bottom contour from the determined bottom contour of the object mask.

In accordance with an embodiment, the shadow generation of one or more standing objects may include generation of the object mask of the object in the target image. The object may be categorized as a standing object. Depth information, at each height of the object mask, may be determined based on an ellipse (an elliptical shape) generated (or constructed) at that height by a horizontal cross-section of the mask. The generated ellipse is positioned parallel to the ground plane of the image (the image ground may be defined by the camera view angle, alfa). The complete shadow of the object in the target image may be generated, based on the determined depth information at all the pre-determined heights. Further, the shadow of the object in the target image may be generated based on an ambient source of light. The ambient source of light may comprise a plurality of point light sources. The plurality of point light sources may be positioned in a circular pattern parallel to a ground plane (such as a floor of a scene of the target image) associated with the target image, such that azimuthal angles of the plurality of point light sources are equal. The generated shadow of the object in the target image may include a plurality of shadows of the object generated by the plurality of point light sources.

FIG. 1 is a block diagram that illustrates a network environment for shadow generation of objects embedded in a target image, in accordance with an embodiment of the disclosure. With reference to FIG. 1, there is shown a network environment that comprises an image-processing device 102, a database server 104, an application server 106, and a communication network 108. The image-processing device 102 may include a display screen 110. The image-processing device 102 may be communicatively coupled with the database server 104 and the application server 106, via the communication network 108.

The image-processing device 102 may comprise suitable logic, circuitry, interfaces, and/or code that may be configured to extract one or more objects from a source image. The image-processing device 102 may be further configured to embed the extracted one or more objects in the target image. The image-processing device 102 may be further configured to categorize one or more object masks into a first category or a second category. The image-processing device 102 may be further configured to display generated shadows of the embedded one or more objects on the display screen 110. Examples of the image-processing device 102 may include, but are not limited to, an image capturing device (such as a digital camera or an image scanner), a computing device (such as a laptop or a smartphone), and a printing device (such as a printer).

The database server 104 may comprise suitable logic, circuitry, interfaces, and/or code that may be configured to store one or more source images. The database server 104 may be further configured to store a target image. The database server 104 may be further configured to store one or more parameters provided by a user. The database server 104 may be communicatively coupled with a remote electronic device, such as the image-processing device 102, via the communication network 108. The database server 104 may be implemented by use of several technologies that are well known to those skilled in the art.

The application server 106 may comprise suitable logic, circuitry, interfaces, and/or code that may be configured to host one or more applications to generate the shadow of the object in the target image. The application server 106 may be configured to host the one or more applications for the one or more subscribed devices, such as the image-processing device 102. The application server 106 may be communicatively coupled to the image-processing device 102 and the database server 104, via the communication network 108. The application server 106 may be implemented by use of several technologies that are well known to those skilled in the art.

A person with ordinary skill in the art will understand that the scope of the disclosure is not limited to the database server 104 and the application server 106 as separate entities. In accordance with an embodiment, the functionalities of the database server 104 and the application server 106 may be combined into a single server without limitation of the scope of the disclosure. A person with ordinary skill in the art will further understand that the scope of the disclosure is not limited to the image-processing device 102 and the application server 106 as separate entities. In accordance with an embodiment, the functionalities of the image-processing device 102 may be combined into a server, such as the application server 106, or vice-versa, without limitation of the scope of the disclosure.

The communication network 108 may include a medium through which the image-processing device 102 may communicate with one or more servers, such as the database server 104 and the application server 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

In operation, the image-processing device 102 may be configured to extract the one or more source images and/or the target image from the database server 104. In accordance with another embodiment, the image-processing device 102 may be configured to receive the one or more source images and/or the target image from a user-computing device (not shown). The image-processing device 102 may be further configured to receive the one or more parameters provided by the user. Examples of the one or more parameters provided/defined by the user may include, but are not limited to, a first pre-defined value, a second pre-defined value, a user-specified location in the target image, a pre-determined height of the object, and/or a pre-determined multiplication factor. The image-processing device 102 may store the extracted and/or received one or more parameters, the one or more source images, the target image, the one or more applications, and/or the like in one or more memory units.

In accordance with an embodiment, the image-processing device 102 may be further configured to extract the one or more objects from the one or more source images. The image-processing device 102 may be further configured to embed the extracted one or more objects at one or more user-specified locations in the target image, as described in detail in FIG. 3A. The image-processing device 102 may be further configured to extract and/or download the one or more applications from the application server 106, which may be utilized to modify the one or more objects in the target image. The modification may include graphical operations, such as translation, scaling, color and brightness adjustment, of the one or more objects embedded in the target image.

The image-processing device 102 may be configured to generate an object mask of each of the one or more objects embedded in the target image. The generation of the object mask of each of the one or more objects embedded in the target image is described in detail in FIGS. 2 and 3B. In accordance with an embodiment, the image-processing device 102 may be configured to categorize the one or more object masks into one of the first category or the second category. The first category may correspond to a category that comprises sitting objects and the second category may correspond to a category that comprises standing objects.

The image-processing device 102 may categorize the one or more object masks into the first category or the second category, based on a pre-determined set of rules. The pre-determined set of rules may be based on a ratio of a width of each of the one or more object masks (at a pre-determined height) and corresponding height of each of the one or more object masks, and/or a count of extremities of the one or more object masks at the pre-determined height. The count of extremities of each of the one or more object masks may be based on a corresponding count of connected regions at the pre-determined height of each object mask. In accordance with an embodiment, the one or more object masks are categorized into the first category when the ratio is equal to or greater than a first pre-defined value and a count of extremities of the one or more object masks at the pre-determined height is less than a second pre-defined value. In accordance with an embodiment, the one or more object masks are categorized into the second category when the ratio is less than the first pre-defined value. In accordance with an embodiment, the one or more object masks are categorized into the second category when the ratio is equal to or greater than the first pre-defined value and the count of extremities of the one or more object masks at the pre-determined height is equal to or greater than the second pre-defined value. The categorization of the one or more object masks are described in detail in FIGS. 2 and 3C.

In accordance with an embodiment, when the one or more object masks correspond to the first category, the image-processing device 102 may be configured to generate a contour of the one or more object masks. The image-processing device 102 may be further configured to determine a bottom contour of each of the one or more object masks. Further, the image-processing device 102 may be configured to dilate the determined bottom contour of each object mask (which corresponds to the first category) by a pre-determined multiplication factor. For example, a pre-determined dilation may be applied to the bottom contour of each of the one or more object masks. Based on the dilated bottom contour of each object mask, the image-processing device 102 may be further configured to determine the dilated bottom contour between vertical lines at the left-most contour point and the right-most contour point for each object mask. The image-processing device 102 may be further configured to generate one or more shadows of the one or more objects in the target image, based on the determined dilated bottom contour associated with each of the one or more object masks. Further, the image-processing device 102 may be configured to control a brightness of the generated one or more shadows of the one or more objects. The image-processing device 102 may be configured to control the brightness of generated shadow of each object, based on at least a distance of each pixel in the determined dilated bottom contour from the determined bottom contour for each object. The generation of the one or more shadows of the one or more objects that correspond to the first category is described in detail in FIGS. 2 and 3D.

In accordance with an embodiment, when the one or more object masks correspond to the second category, the image-processing device 102 may be configured to determine depth information of such one or more object masks at the pre-determined height. The depth information, at each height of the object mask, may be determined based on an elliptical shape generated (or constructed) at that height by a horizontal cross-section of the mask. The generated elliptical shape (or ellipse) is positioned parallel to the ground plane of the image (the image ground may be defined by the camera view angle, alfa ("a" angle described in FIG. 3E)). The complete shadow of the object in the target image may be generated, based on the determined depth information at all the pre-determined heights. The length of a first axis of the ellipse may be equal to the cross section length in the mask. The length of a second axis of the ellipse may be taken as a pre-determined fraction of the length of the first axis. Further, the image-processing device 102 may be configured to utilize the depth information to generate the one or more shadows of the one or more embedded objects. In accordance with an embodiment, the generated one or more shadows may correspond to one or more portions of the one or more objects (which correspond to the second category) up to the pre-determined height from a base (or a ground).

The image-processing device 102 may be further configured to utilize an ambient source of light to generate the one or more shadows of each of the one or more objects (which correspond to the second category) embedded in the target image. The ambient source of light may comprise a plurality of point light sources. The plurality of point light sources may be assumed to be positioned in a circle with an infinite radius, such that the circle is parallel to a ground plane associated with the target image. Further, the plurality of point light sources may be positioned in a manner, such that the azimuthal angles of the plurality of point light sources are equal. The image-processing device 102 may be further configured to generate a plurality of shadows of each extremity of the one or more objects, based on the plurality of point light sources. The image-processing device 102 may be further configured to generate the one or more shadows of each of the one or more objects, based on the plurality of shadows generated for each extremity of each object. In accordance with an embodiment, the generated one or more shadows of each extremity of the one or more objects may include a shadow that corresponds to a cross-sectional area of each extremity at the pre-determined height. The generation of the one or more shadows of the one or more objects that correspond to the second category is described in detail in FIGS. 2, 3E and 3F.

Figure 2:
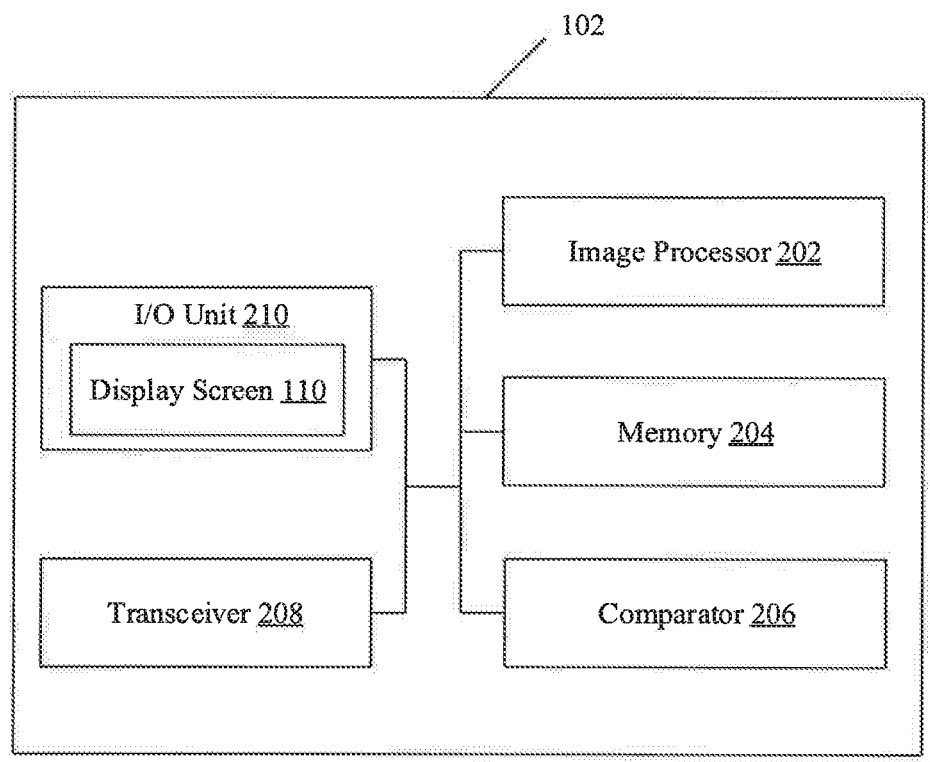
FIG. 2 is a block diagram that illustrates an exemplary image-processing device, in accordance with an embodiment of the disclosure.

FIG. 2 is a block diagram that illustrates an exemplary image-processing device, in accordance with an embodiment of the disclosure. FIG. 2 is explained in conjunction with elements from FIG. 1. With reference to FIG. 2, there is shown various components of the image-processing device 102. The image-processing device 102 may comprise one or more processors, such as an image processor 202, one or more memory units, such as a memory 204, and one or more comparators, such as a comparator 206. The image-processing device 102 may further comprise one or more transceivers, such as a transceiver 208 and one or more input/output (I/O) devices, such as an I/O unit 210. The I/O unit 210 may comprise the display screen 110. The image processor 202 may be communicatively coupled to the memory 204, the comparator 206, the transceiver 208, and the I/O unit 210.

The image processor 202 may comprise suitable logic, circuitry, interfaces, and/or code that may be configured to execute a set of instructions stored in the memory 204. The image processor 202 may be configured to perform one or more operations. For example, the one or more operations may comprise, but are not limited to, extract one or more objects from one or more source images, embed the extracted one or more objects at one or more user-specified locations in a target image, generate an object mask of each of the one or more objects embedded in the target image, categorize each of the one or more object masks into a first category or a second category, and/or generate a shadow of each of the one or more objects embedded in the target image based on at least the categorization. The image processor 202 may be further configured to extract one or more applications from the memory 204 or the application server 106. The image processor 202 may be further configured to utilize the extracted one or more applications to modify the one or more objects when embedded in the target image. The image processor 202 may be implemented, based on a number of processor technologies known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or other processors.

The memory 204 may comprise suitable logic, circuitry, and/or interfaces that may be configured to store a machine code and/or a computer program that has at least one code section executable by the image processor 202. The memory 204 may be configured to store the one or more source images, the target image, and one or more parameters. The memory 204 may be further configured to store one or more computer vision algorithms and/or image processing algorithms known in the art. Examples of implementation of the memory 204 may include, but are not limited to, Random Access Memory (RAM), Read Only Memory (ROM), Hard Disk Drive (HDD), and/or a Secure Digital (SD) card.

The comparator 206 may comprise suitable logic, circuitry, and/or interfaces that may be configured to compare the ratio of the width of the one or more object masks (at the pre-determined height) and height of the one or more object masks with the first pre-defined value. The comparator 206 may be configured to compare the count of extremities of the one or more object masks with the second pre-defined value. The comparator 206 may be realized through either software technologies or hardware technologies known in the art.

The transceiver 208 may comprise suitable logic, circuitry, interfaces, and/or code that may be configured to communicate with the image processor 202, the memory 204, and/or the comparator 206. Examples of the transceiver 208 may include, but are not limited to, an antenna, an Ethernet port, a USB port, or any other port that may be configured to receive and transmit data, such as the source image or the target image. The transceiver 208 may receive and transmit the data in accordance with various communication protocols, such as TCP/IP, UDP, and 2G, 3G, or 4G communication protocols based on an input through the I/O unit 210.

The I/O unit 210 may comprise suitable logic, circuitry, interfaces, and/or code that may be configured to receive the one or more parameters from a user. The I/O unit 210 may further provide an output to the user. The I/O unit 210 may comprise various input and output devices that may be configured to communicate with the image processor 202. The I/O unit may comprise the display screen 110. The display screen 110 may be configured to display the one or more source images, the target image, and/or generated shadows of the one or more objects embedded in the target image. Examples of the I/O unit 210 may include, but are not limited to, a keyboard, a mouse, a joystick, a touch screen, a touch pad, a microphone, a camera, a motion sensor, and/or a light sensor. Examples of the display screen 110 may include, but are not limited to, Liquid Crystal Display (LCD) display, Light Emitting Diode (LED) display, and/or Organic LED (OLED) display technology.

In operation, the transceiver 208 may be configured to extract the one or more source images and/or the target image from the database server 104, via the communication network 108. In accordance with an embodiment, the transceiver 208 may be configured to receive the one or more source images and/or the target image from the user-computing device (not shown), via the communication network 108. Each of the one or more source images may comprise one or more objects. However, the target image may or may not comprise one or more objects.

The transceiver 208 may be configured to extract or receive the one or more source images and/or the target image, based on a user input provided via the I/O unit 210. The transceiver 208 may be further configured to communicate the extracted or received one or more source images and/or the target image to the image processor 202.

In accordance with an embodiment, the image processor 202 may be configured to receive one or more parameters provided by the user, via the I/O unit 210. In accordance with an embodiment, the one or more parameters may be automatically determined by the image processor 202, based on hardware and/or software configurations of the image-processing device 102. Examples of the one or more user-defined parameters may include, but are not limited to, a first pre-defined value, a second pre-defined value, a selection of one or more objects in the source image, a user-specified location in the target image, a pre-determined height of the object, and/or a pre-determined multiplication factor.

In accordance with an embodiment, the image processor 202 may be configured to extract the one or more objects from the one or more source images, based on a selection of the one or more objects in the one or more source images. The selection of the one or more objects may be provided by the user, via the I/O unit 210. The selection may be indicative of a preference of the user for the one or more objects (in the one or more source images) to be embedded in the target image.

In accordance with an embodiment, the image processor 202 may be further configured to embed the one or more extracted objects in the target image, based on one or more computer vision algorithms and/or image processing algorithms known in the art. The image processor 202 may be configured to embed the one or more extracted objects at the one or more user-specified locations in the target image, based on an input provided by the user, via the I/O unit 210. The input may be indicative of one or more preferred locations in the target image where the user desires to embed the one or more extracted objects. An exemplary scenario of the one or more embedded objects in the target image has been explained in FIG. 3A.

In accordance with an embodiment, the image processor 202 may be configured to generate an object mask of each of the one or more objects embedded in the target image, based on one or more computer vision algorithms and/or image processing algorithms known in the art. The image processor 202 may be configured to set (or adjust) pixel values of each embedded object in the target image to zero and/or some other pixel value to generate the object mask of each embedded object. For example, the object mask may be generated by use of a particle analysis tool or an object convolution technique known in the art. An exemplary scenario for the generation of the object mask of the object embedded in the target image has been explained later in conjunction with FIG. 3B.

In accordance with an embodiment, the image processor 202, in conjunction with the comparator 206, may be further configured to categorize the one or more object masks in the target image into a first category or a second category. The first category may correspond to a category that comprises sitting objects. The second category may correspond to a category that comprises standing objects. The image processor 202, in conjunction with the comparator 206, may be configured to categorize the one or more object masks into the first category or the second category, based on a pre-determined set of rules. The pre-determined set of rules may be based on a ratio of the width of each of the one or more object masks (at the pre-determined height) and the corresponding height of each of the one or more object masks, and/or a corresponding count of the extremities of each of the one or more object masks. The count of extremities of each object mask may be based on a count of connected regions at the pre-determined height of each object mask.

In accordance with an embodiment, the image processor 202, in conjunction with the comparator 206, may be configured to categorize the one or more object masks into the first category when the ratio is equal to or greater than the first pre-defined value and the count of extremities of the one or more object masks at the pre-determined height is less than the second pre-defined value. In accordance with an embodiment, the image processor 202, in conjunction with the comparator 206, may be configured to categorize the one or more object masks into the second category when the ratio is less than the first pre-defined value. In accordance with an embodiment, the image processor 202, in conjunction with the comparator 206, may be configured to categorize the one or more object masks into the second category when the ratio is equal to or greater than the first pre-defined value and the count of extremities of the one or more object masks at the pre-determined height is equal to or greater than the second pre-defined value.

In accordance with an embodiment, the first pre-defined value and the second predefined value may correspond to a numerical value, such as "0.5" and "2", respectively. The first pre-defined value and the second pre-defined value may be provided (or pre-defined) by the user, and may be utilized to determine a category of an object mask in the target image.

In a first example, the height of a first object mask may be, "1.1 meters", and the width at the pre-determined height, such as at "25 percent" of the height of the first object mask may be, "0.6 meter". The count of extremities of the first object mask at the pre-determined height may be, "4". The ratio may be determined as, "0.6/1.1=0.54". The comparator 206 may compare the determined ratio of the first object mask with the first pre-defined value, and the count of extremities of the first object mask with the second pre-defined value. The image processor 202, based on the output of the comparator 206, may determine that the determined ratio, "0.54", exceeds the first pre-defined value, "0.5". Further, the count of extremities of the first object mask is "1" that is less than the second pre-defined value, "2". Thus, the image processor 202, in conjunction with the comparator 206, may categorize the first object mask in the first category.

In a second example, the height of a second object mask may be, "1.95 meters", and the width at the pre-determined height, such as at "25 percent" of the height of the second object mask may be, "1.5 meter". The count of extremities of the second object mask at the pre-determined height may be, "4". The ratio may be determined as, "1.5/1.95=0.77". The comparator 206 may compare the determined ratio of the second object mask with the first pre-defined value, and the count of extremities of the second object mask with the second pre-defined value. The image processor 202, based on the output of the comparator 206, may determine that the determined ratio, "0.77", exceeds the first pre-defined value, "0.5". Further, the count of extremities of the second object mask is "4" exceeds the second pre-defined value, "2". Thus, the image processor 202, in conjunction with the comparator 206, may categorize the second object mask in the second category.

In a third example, the height of a third object mask may be, "1.95 meters", and the width at the pre-determined height, such as at "25 percent" of the height of the third object mask may be, "0.5 meter". The ratio may be determined as, "0.5/1.95=0.26". The comparator 206 may compare the determined ratio of the third object mask with the first pre-defined value. The image processor 202, based on the output of the comparator 206, may determine that the determined ratio, "0.26", is less than the first pre-defined value, "0.5". Thus, the image processor 202, in conjunction with the comparator 206, may categorize the third object mask in the second category. In accordance with an embodiment, when the one or more object masks may correspond to the first category, the image processor 202 may be configured to generate a contour of the one or more object masks. The contour of an object mask may correspond to an outline, which traces a shape or a boundary of the object mask. The image processor 202 may be further configured to determine a bottom contour of each of the one or more object masks (that corresponds to the first category). The bottom contour of each object mask may correspond to a lower portion of the generated contour between a left-most contour point and a right-most contour point of the corresponding mask.

In accordance with an embodiment, the image processor 202 may be further configured to dilate the determined bottom contour of each object mask (which corresponds to the first category) by a pre-determined multiplication factor. For example, the image processor 202 may be configured to apply a pre-determined dilation, such as "10-times" dilation, to the determined bottom contour of the object mask that corresponds to the first category. Based on the dilated bottom contour of each object mask (which corresponds to the first category), the image processor 202 may be further configured to truncate the dilated bottom contour between two vertical lines, such that one vertical line is at the left-most contour point and another vertical line is at the right-most contour point.

In accordance with an embodiment, the image processor 202 may be configured to generate one or more shadows of the one or more objects in the target image, based on the truncated dilated bottom contour associated with each of the one or more object masks. Further, the image processor 202 may utilize a pre-defined blending look-up table to generate the one or more shadows of the one or more objects (which correspond to the first category). In accordance with an embodiment, the image processor 202 may be further configured to control the brightness of the generated one or more shadows of the one or more objects. The image processor 202 may control the brightness of the generated shadow of each object that corresponds to the first category, based on at least a distance of each pixel in the determined dilated bottom contour from the determined bottom contour of corresponding object.

In accordance with an embodiment, when the one or more object masks correspond to the second category, the image processor 202 may be configured to determine depth information at each height of the one or more object masks. The depth information, at each height of the object mask, may be determined based on an elliptical shape generated (or constructed) at that height by a horizontal cross-section of the mask. The generated elliptical shape (or ellipse) is positioned parallel to the ground plane of the image (the image ground may be defined by the camera view angle, alfa ("a" angle described in FIG. 3E)). The complete shadow of the object in the target image may be generated, based on the determined depth information at all the pre-determined heights. The length of a first axis (such as a pre-determined major axis) of the ellipse may be equal to the cross section length in the mask. The length of a second axis (such as a pre-determined minor axis) of the ellipse may be taken as a pre-determined fraction of the length of the first axis. The depth information (or thickness) at each height may be created or generated in a shape of an ellipse, such that the pre-determined vertical cross-sectional length of the ellipse is "20 percent" of the pre-determined horizontal cross-sectional length of the ellipse.

The image processor 202 may be further configured to utilize the depth information to generate one or more shadows of the one or more objects (which correspond to the second category) embedded in the target image. In accordance with an embodiment, the image processor 202 may be further configured to utilize an ambient source of light to generate the one or more shadows of each of the one or more objects (which correspond to the second category) in the target image. The ambient source of light may comprise a plurality of point light sources. The image processor 202 may assume the plurality of point light sources to be positioned in a circle with an infinite radius, such that a plane of the circle is parallel to a ground plane associated with the target image. Further, the image processor 202 may position the plurality of point light sources in the circle with the infinite radius, such that the azimuthal angles of the plurality of point light sources are equal. Further, each of the plurality of point light sources may be associated with a constant polar angle with a plane, which may be parallel to the ground plane.

In accordance with an embodiment, the image processor 202 may be configured to generate a plurality of shadows for each extremity of the one or more objects, based on the plurality of point light sources. The image processor 202 may be further configured to generate the one or more shadows of each of the one or more objects, based on the plurality of shadows of each extremity of each object mask. In accordance with an embodiment, the generated one or more shadows of each extremity of the one or more objects may include a shadow that corresponds to a cross-sectional area of each extremity at the pre-determined height. An exemplary scenario of the generated shadow of a standing object embedded in the target image has been explained later in conjunction with FIG. 3F.

FIGS. 3A to 3G illustrate an exemplary scenario for the disclosed method for shadow generation of objects embedded in a target image, in accordance with various embodiments of the disclosure. FIGS. 3A to 3G are explained in conjunction with elements from FIG. 1 and FIG. 2.

Figure 3A:
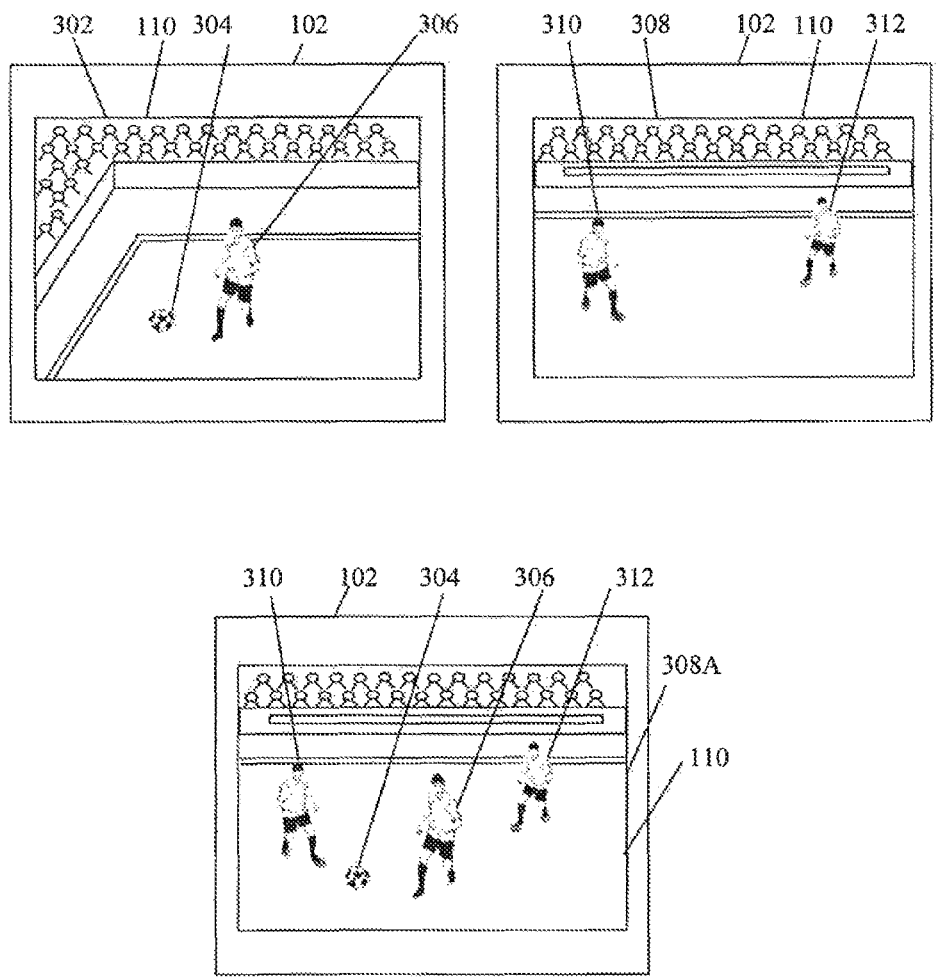
FIGS. 3A to 3G illustrate an exemplary scenario to implement the disclosed apparatus and method for shadow generation of objects embedded in a target image, in accordance with an embodiment of the disclosure.

With reference to FIG. 3A, there is shown an exemplary method for embedding a first source object and a second source object (extracted from a source image) in a target image, in accordance with an embodiment of the disclosure. The image-processing device 102 may be configured to display a source image 302 on the display screen 110. The image-processing device 102 may be configured to display a target image 308 on the display screen 110 of the image-processing device 102. The source image 302 may further include a first source object 304 and a second source object 306. The target image 308 may further include a first target object 310 and a second target object 312. There is further shown a first modified target image 308A in which the first source object 304 and the second source object 306 have been embedded.

The image processor 202 may receive a first input and a second input provided by a user. The first input may be representative of a preference of the user for one or more objects, such as the first source object 304 and the second source object 306, in the source image 302. In such a scenario, the image processor 202 may extract the first source object 304 and the second source object 306 from the source image 302. The second input may be representative of one or more locations in the target image 308, at which the one or more objects (such as the first source object 304 and the second source object 306) extracted from the source image 302 may be embedded. For example, the second input corresponds to a location between the first target object 310 and the second target object 312. In such a case, the image processor 202 may be configured to embed the extracted first source object 304 and second source object 306 at the location between the first target object 310 and the second target object 312. This may be done to obtain the first modified target image 308A. The image processor 202 may display the first modified target image 308A on the display screen 110 of the image-processing device 102.

Figure 3B:
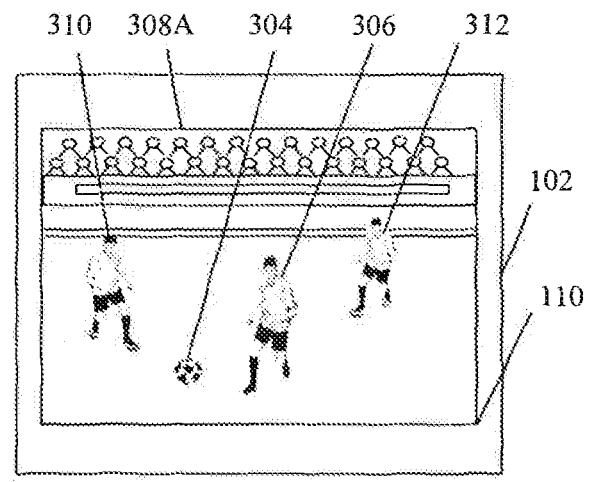
Figure 3B:
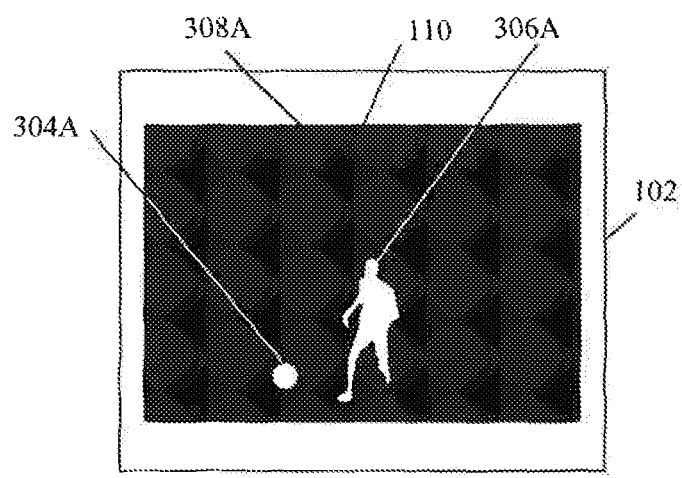

With reference to FIG. 3B, there is shown an exemplary method for generation of object masks of an embedded first source object and an embedded second source object, in accordance with an embodiment of the disclosure. The image-processing device 102 may be configured to display the first modified target image 308A. The first modified target image 308A includes the embedded first source object 304, the embedded second source object 306, the first target object 310, and the second target object 312. The image processor 202 may be further configured to generate an object mask of the embedded objects (such as the first source object 304 and the second source object 306) in the first modified target image 308A. The image processor 202 may utilize one or more standard techniques known in the art, such as a particle analysis tool, an object convolution technique and/or the like, to generate the object mask of the embedded objects in the first modified target image 308A. The object mask of the first source object 304 may correspond to a first object mask 304A. The mask of the second source object 306 may correspond to a second object mask 306A. Further, the image processor 202 may display the generated first object mask 304A and the second object mask 306A of the first source object 304 and the second source object 306, respectively, on the display screen 110 of the image-processing device 102.

Figure 3C:
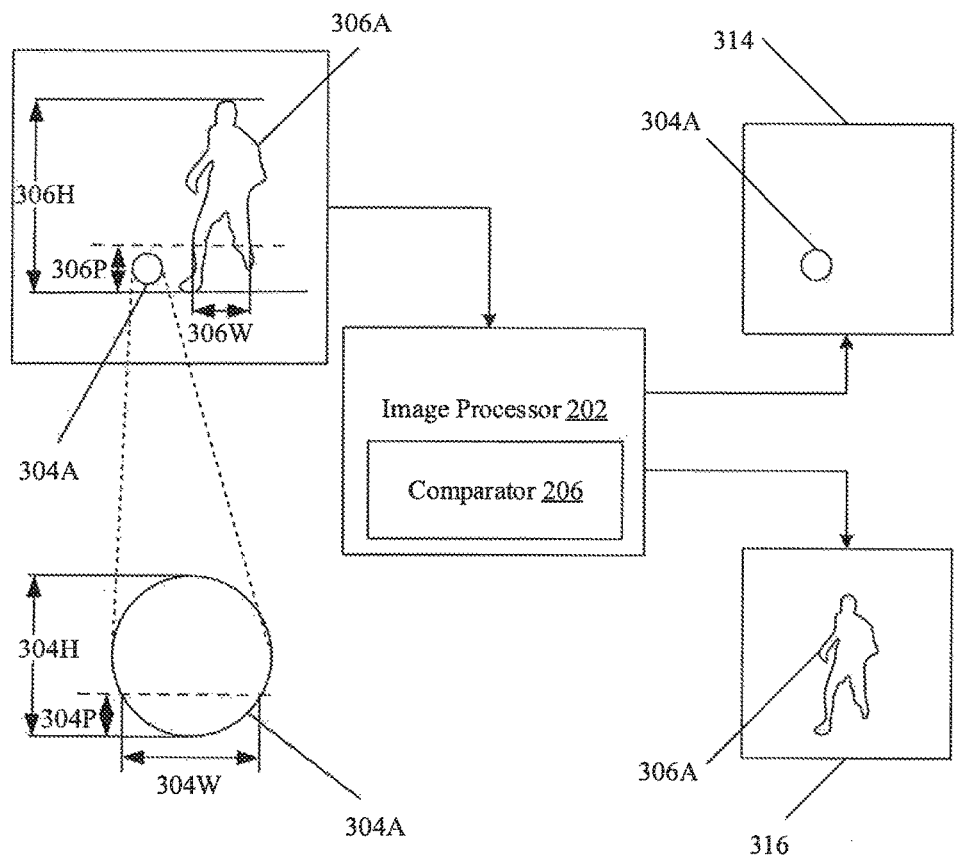

With reference to FIG. 3C, there is shown an exemplary method for categorization of the one or more object masks, in accordance with an embodiment of the disclosure. There is shown the image processor 202 and the comparator 206. The image processor 202, in conjunction with the comparator 206, may be configured to categorize the one or more object masks, such as the first object mask 304A and the second object mask 306A, into one of a first category 314 or a second category 316.

In accordance with the flow diagram, the image processor 202 may be configured to determine heights 304H and 306H of the first object mask 304A and the second object mask 306A, respectively. For example, the determined heights 304H and 306H (of the respective first object mask 304A and the second object mask 306A) may be "0.3 meter", and "1.8 meter", respectively. The image processor 202 may be further configured to determine a width 304W of the first object mask 304A at a pre-determined height 304P. The image processor 202 may be further configured to determine a width 306W of the second object mask 306A at a pre-determined height 306P. The image processor 202 may experimentally determine that the predetermined height of an object mask may be 25 percent of the actual height of the object mask as the bottom portion geometry contains sufficient information for dissent shadow calculation. For example, the image processor 202 may determine the width 304W of the first object mask 304A to be "0.15 meter", at the pre-determined height 306P that is "0.07 meter". Similarly, the image processor 202 may determine the width 306W of the second object mask 306A to be "0.6 meter", at the pre-determined height 306P that is "0.45 meter".

Accordingly, the image processor 202 may be configured to determine a first ratio of the width 304W of the first object mask 304A (at the pre-determined height 304P) and the height 304H of the first object mask 304A. The image processor 202 may be further configured to determine a second ratio of the width 306W of the second object mask 306A (at the pre-determined height 306P) and the height 306H the second object mask 306A. In accordance with the above example, the image processor 202 may determine the first ratio to be, "0.15 meter/0.3 meter=0.5", and the second ratio to be, "0.6 meter/1.8 meter=0.33".

Further, the comparator 206 may be configured to compare the determined first ratio, "0.5", and the second ratio, "0.33", of the first object mask 304A and the second object mask 306A, respectively, with a first pre-defined value, such as "0.5". Accordingly, the comparator 206 may determine that the first ratio, "0.5", is equal to the first pre-defined value, "0.5". In such a case, the image processor 202 may be further configured to determine a count of extremities of the first object mask 304A. The count of extremities of an object mask may be determined based on a count of connected regions at the pre-determined height of the object mask. For example, the count of extremities of the first object mask 304A may be "1", as the count of connected regions at the pre-determined height 304P is "1". Accordingly, the image processor 202, in conjunction with the comparator 206, may categorize the first object mask 304A into a first category 314. The first category 314 may correspond to a category that comprises sitting objects.

The comparator 206 may further determine that the second ratio, "0.33", is less than the first pre-defined value, "0.5". Accordingly, the image processor 202, in conjunction with the comparator 206, may categorize the second object mask 306A into a second category 316. The second category 316 may correspond to a category that comprises standing objects.

Figure 3D:
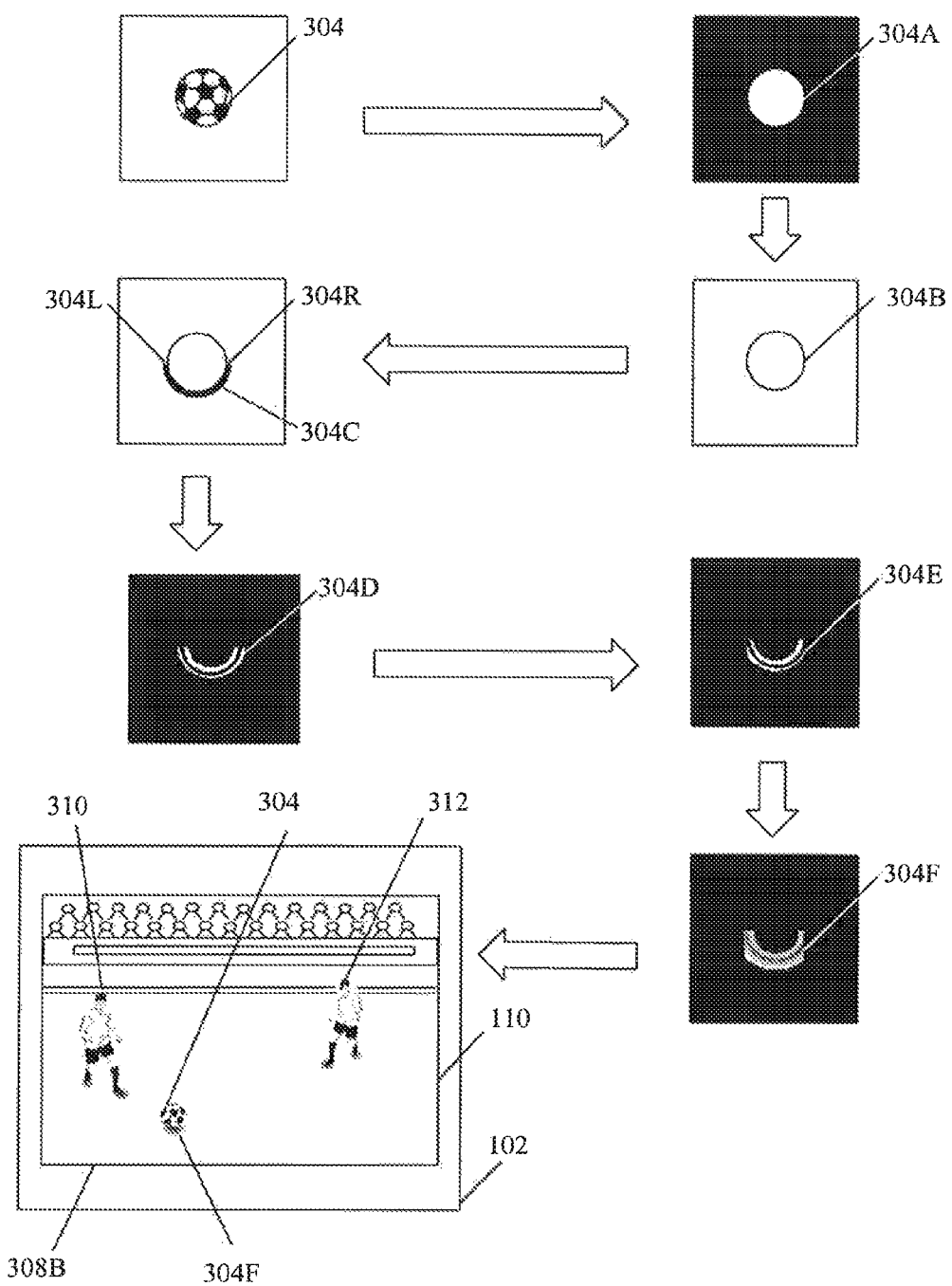

With reference to FIG. 3D, there is shown an exemplary method for generation of shadow of a sitting object, in accordance with an embodiment of the disclosure. The image processor 202 may be configured to display a sitting object, such as a first source object 304, on the display screen 110. The image processor 202 may be further configured to generate an object mask of the first source object 304, to obtain a first object mask 304A. The image processor 202 may be further configured to generate a contour 304B, of the first object mask 304A. The image processor 202 may utilize techniques known in the art to generate the contour 304B of the first object mask 304A.

In accordance with an embodiment, the image processor 202 may be further configured to determine a bottom contour 304C from the generated contour 304B. The bottom contour 304C includes a bottom portion of the generated contour 304B between a left-most contour point 304L and a right-most contour point 304R. The image processor 202 may utilize techniques known in the art to determine the bottom contour 304C from the generated contour 304B. The image processor 202 may be further configured to dilate the determined bottom contour 304C by a pre-determined multiplication factor. For example, the image processor 202 may apply a pre-determined dilation, such as "10-times" dilation, to the determined bottom contour 304C and obtain a dilated bottom contour 304D. The image processor 202 may be configured to determine the dilated bottom contour 304D between the left-most contour point 304L and the right-most contour point 304R.

The image processor 202 may truncate the dilated bottom contour 304D between two parallel vertical planes (at the left-most contour point 304L and the right-most contour point 304R) to generate a truncated dilated bottom contour 304E. The truncated dilated bottom contour 304E may be free from any side-shadow artifacts in the shadow to be generated. Further, the image processor 202 may be configured to determine a blending look-up table by use of one or more standard techniques known in the art. In accordance with an embodiment, the image processor 202 may utilize the truncated dilated bottom contour 304E and/or the determined blending look-up table, to generate a shadow 304F of the sitting object, such as the first source object 304, in a second modified target image 308B.

Figure 3E:
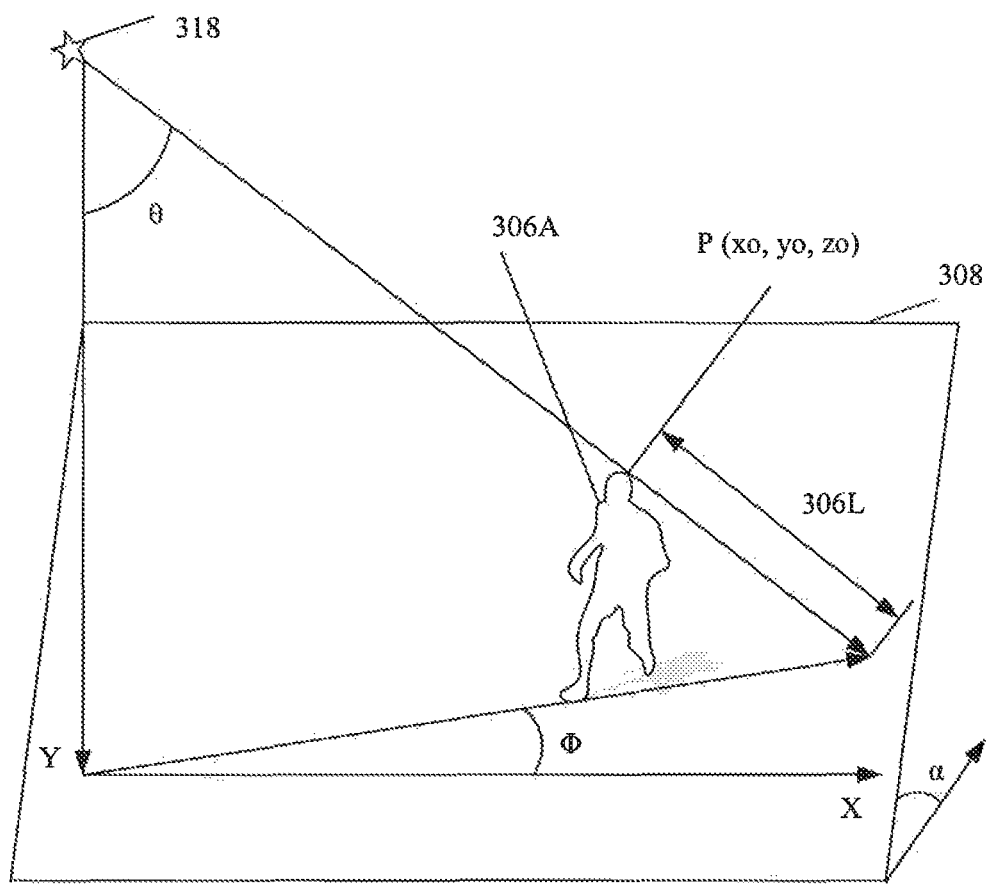

With reference to FIG. 3E, there is shown an exemplary scenario for shadow generation. The image-processing device 102 may be configured to display a portion of the target image 308 and one of the plurality of point light sources, such as a point light source 318. The portion of the target image 308 includes a mask of the standing object, such as the second object mask 306A. The plurality of point light sources may be positioned in a circle with an infinite radius (or a pre-defined radius) at a pre-defined height. The plane, which includes the plurality of point light sources, is parallel to a ground plane associated with the portion of the target image 308. In accordance with an embodiment, the ground plane may correspond a surface on which an object may be standing or sitting, or the like. Further, the azimuthal angles of the plurality of point light sources are equal. For example, an azimuthal angle of the point light source 318 may correspond to an angle, "ϕ=9 degrees". In accordance with an embodiment, the plurality of point light sources are positioned in the circular pattern, such that an angle "θ" between the direction of each of the plurality of point light sources, such as the point light source 318 and a plane (denoted by the Y axis) perpendicular to the ground plane, is constant. The angle "θ" may correspond to a polar angle. For example, the plurality of point light sources (such as, "40 point light sources") may be placed in the circle at the polar angle of, "30 degrees" with angular step of, "9 degrees".

In accordance with an embodiment, a brightness of the shadow of the standing object, such as the second source object 306, may be based on a distance 306L from a point P ("$x_o$","$y_o$","$z_o$") at the second object mask 306A, to the ground plane of the target image 308. The point P ("$x_o$","$y_o$","$z_o$") at the second object mask 306A may correspond to a point of contact of a ray that emanates from the point light source 318 with the second object mask 306A. The brightness of the shadow of the second object mask 306A may be defined as, "$1/(L^\alpha)$", where "α" is a pre-defined value, such as, "1.5". The image processor 202 may determine the distance 306L from the point P ("$x_o$","$y_o$","$z_o$") on the second object mask 306A, to the ground plane of the target image 308, based on equation (1), based on equation (1), as follows:

$$L=(h-y_o-z_o \tan \alpha)/(\mu_y+\mu_z \tan \alpha) \quad (1)$$

where "h" is the height of the second object mask 306A, "α" is the view angle at the scene (such as angle between a camera axis and the ground), "$\mu_y$" is the trigonometric expression "sin θ cos ϕ", and "$\mu_z$" is the trigonometric expression "cos θ".

In accordance with an embodiment, the image processor 202 may be further configured to determine the depth of the shadow, "z", of the second object mask 306A, based on equation (2), as follows:

$$z=(h-y)/\tan \alpha \quad (2)$$

Figure 3F:
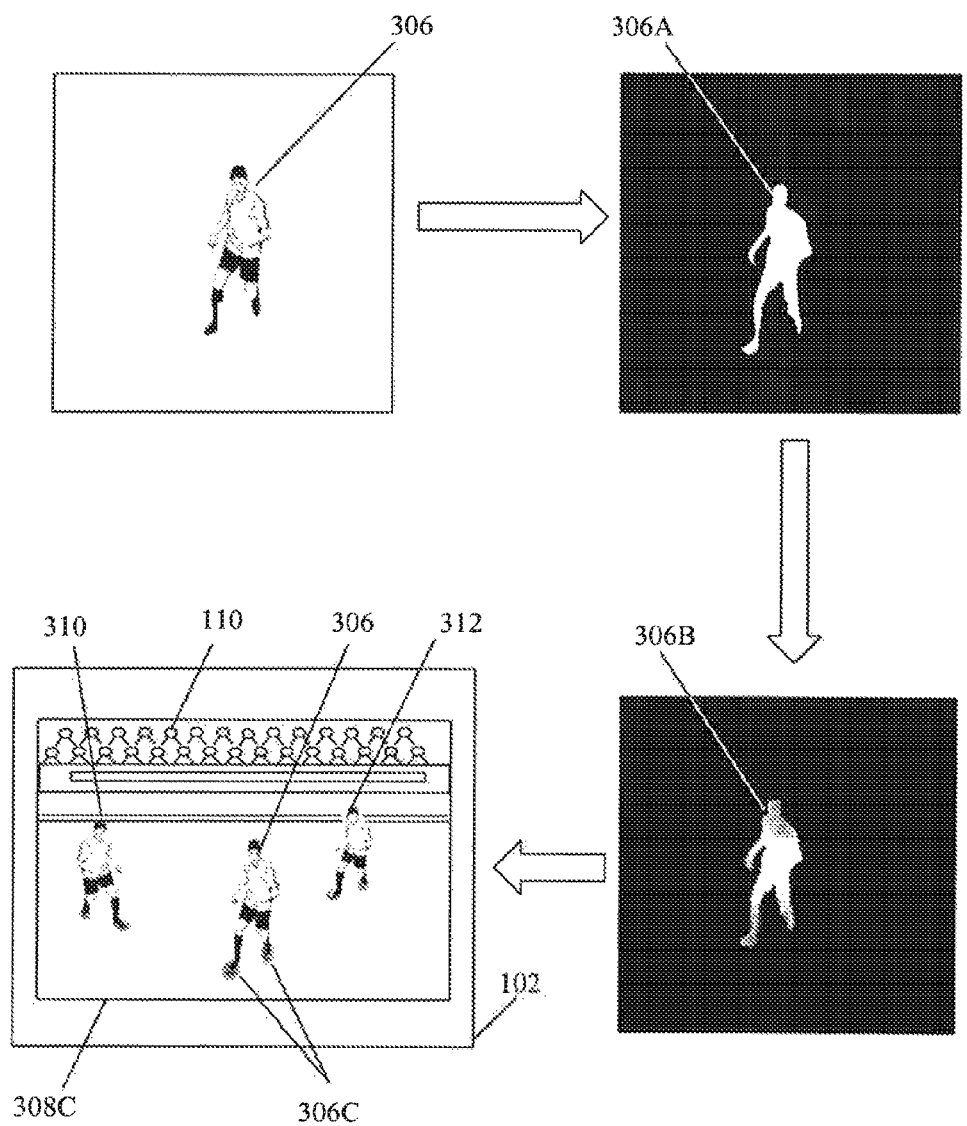

With reference to FIG. 3F, there is shown an exemplary method for generation of shadow of a standing object, in accordance with an embodiment of the disclosure. The image processor 202 may be configured to display a standing object, such as a second source object 306, on the display screen 110. The image processor 202 may be configured to generate a mask of the second source object 306, to obtain a second object mask 306A.

The image processor 202 may be further configured to generate a thickened shadow (multiple over-imposed shadows) of the second object mask 306A. The thickened shadow may be generated in the shape of a projected ellipse to the ground plane at each height of the second object mask 306A. This may be done such that a cross-sectional length of the depth of the ellipse is "20 percent" of a horizontal cross-sectional length of the ellipse. For example, the image processor 202 may generate a thickened second object mask 306B.

Further, the image processor 202 may generate a shadow of the standing object, such as the second source object 306, based on a pre-determined height. For example, the bottom "25 percent" of the thickened second object mask 306B casts an ambient shadow. To generate the shadow of the standing object, based on the pre-determined height, the image processor 202 may generate a plurality shadows at each extremity of the standing object based on the pre-determined height and the plurality of point light sources. The plurality of point light sources may be positioned in a circular pattern in a plane parallel to a ground plane associated with the target image.

Further, the image processor 202 may generate the shadow 306C of the standing object, such as the second source object 306, based on the plurality of shadows. The image processor 202 may generate the shadow based on a combination of the plurality of shadows. The generated shadow 306C of the standing object, such as the second source object 306, further includes a shadow that corresponds to a cross-sectional area of each extremity at the pre-determined height. The generated shadow 306C of the standing object, such as the second source object 306, in a third modified target image 308C is illustrated in FIG. 3F.

A person with an ordinary skill in the art will understand that aforesaid is an exemplary sequence of generation of shadows of the objects in the first and the second category. However, the disclosure may not be so limited and the sequence of generation of shadows may be altered, in accordance with the user preference. Further, the shadows of the objects in the first and the second category may be simultaneously generated, without deviation from the scope of the disclosure.

Figure 3G:
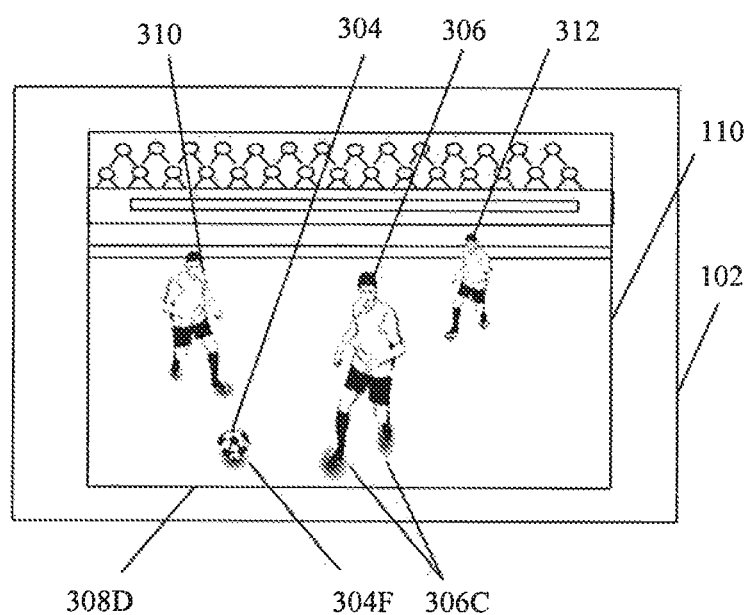

With reference to FIG. 3G, there is shown an exemplary user interface that may be presented on the image-processing device 102, in accordance with an embodiment of the disclosure. FIG. 3G has been described in conjunction with elements of FIGS. 1 to 3F. With reference to FIG. 3G, there is shown a user interface (UI), which may be presented at the display screen 110 of the image-processing device 102.

The UI may be configured to display a final target image 308D. The final target image 308D is the combination of the generated shadow 304F (FIG. 3D) of the first source object 304 and the generated shadow 306C (FIG. 3F) of the second source object 306. Thus, the final target image 308D includes the first target object 310 and the second target object 312 and the corresponding shadows. The UI may be further configured to display the first source object 304, the second source object 306 and the corresponding generated shadows 304F and 306C, respectively.

Figure 4A:
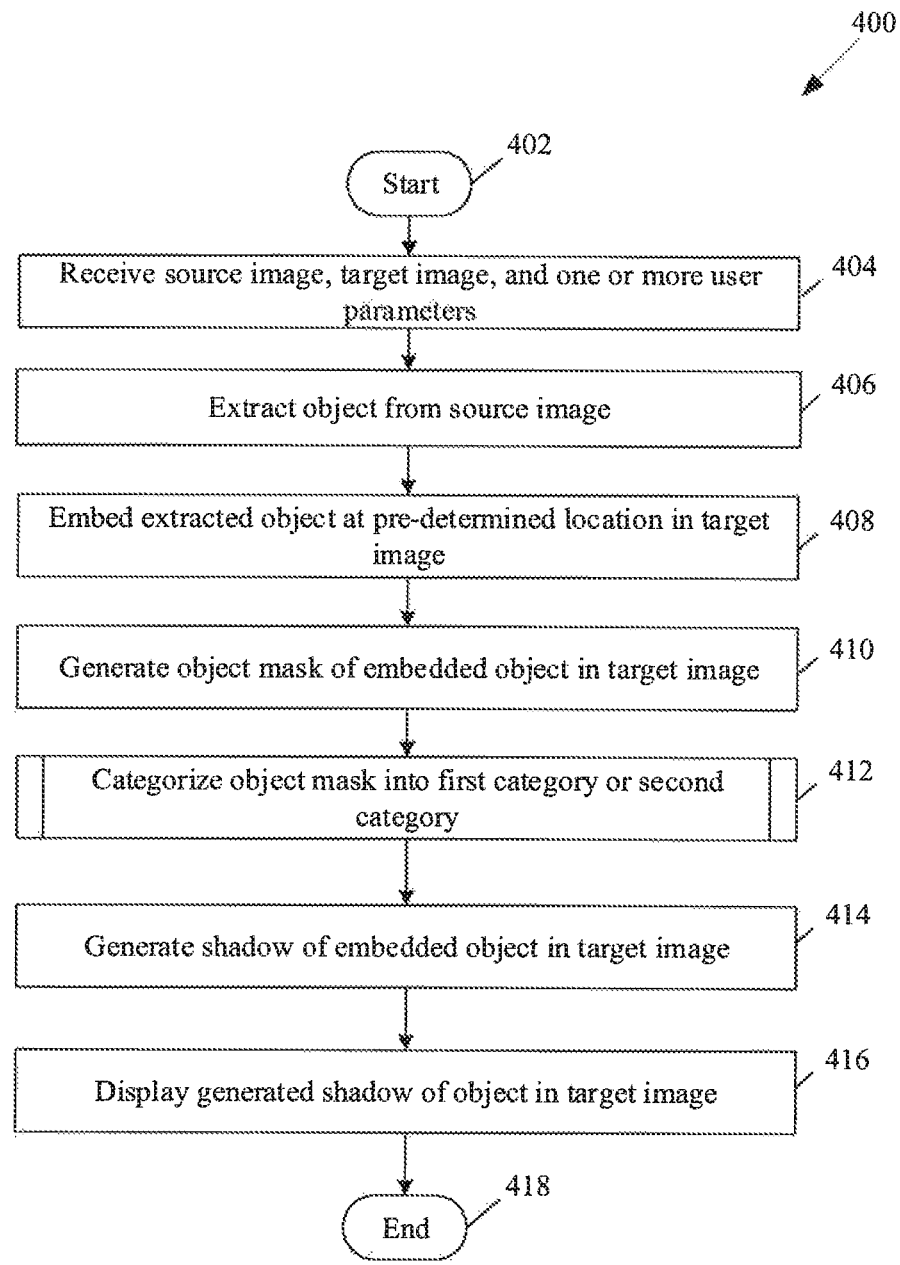
FIGS. 4A and 4B collectively depict a flow chart that illustrates a method for shadow generation of objects embedded in a target image, in accordance with an embodiment of the disclosure.
Figure 4B:
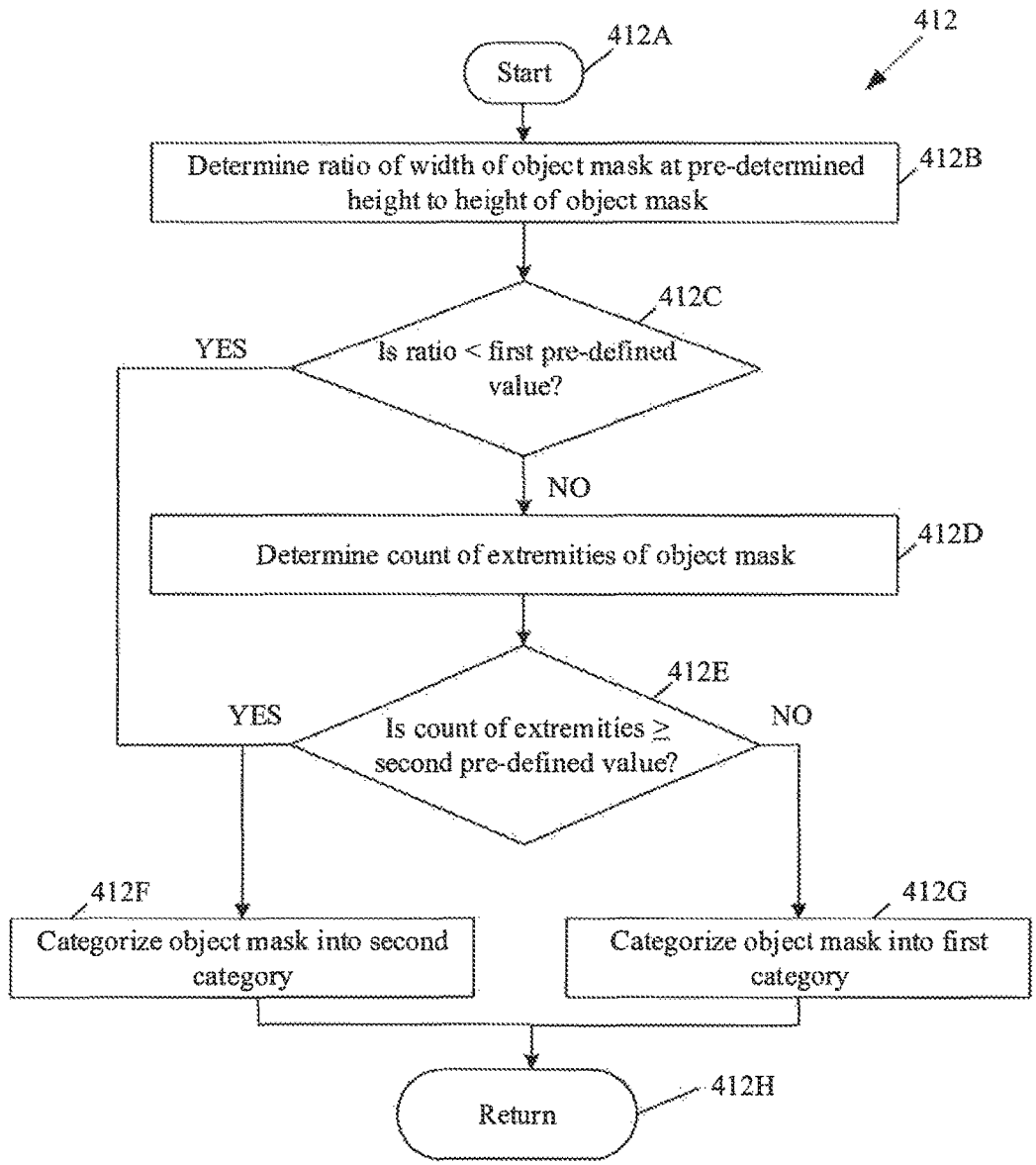

FIGS. 4A and 4B collectively depict a flow chart that illustrates a method to generate a shadow of an object in target image, in accordance with an embodiment of the disclosure. With reference to FIG. 4A, there is shown a flow chart 400. The flow chart 400 is described in conjunction with FIGS. 1, 2, and 3A to 3G. The method starts at step 402 and proceeds to step 404.

At step 404, a source image, a target image, and/or one or more user parameters may be received or extracted. The image-processing device 102 may be configured to receive or extract the source image, the target image, and/or the one or more user parameters from the memory 204 or the database server 104. The one or more user parameters may correspond to one or more parameters defined/specified by the user. At step 406, an object may be extracted from the source image. The image processor 202 may be configured to extract the object from the source image, based on an input provided by a user.

At step 408, the extracted object may be embedded at a pre-determined location in the target image. The image processor 202 may be configured to embed the extracted object at the pre-determined location in the target image, based on an input provided by the user. The pre-determined location may correspond to a location in the target image, which may be specified by the user.

At step 410, an object mask of the embedded object in the target image may be generated. The image processor 202 may be configured to generate the object mask of the embedded object in the target image. At step 412, the object mask may be categorized into a first category or a second category. The first category may correspond to a category that comprises sitting objects and the second category may correspond to a category that comprises standing objects. The image processor 202, in conjunction with the comparator 206, may be configured to categorize the object mask into the first category or the second category, based on a pre-determined set of rules. The pre-determined set of rules may be based on a width and a height of the object mask, and/or a count of the extremities of the object mask. The width of the object mask may correspond to a width at a pre-determined height of the object mask. The count of extremities of the object mask may be based on a count of connected regions at the pre-determined height of the object mask. Control passes to another flow chart in FIG. 4B that illustrates a sub-method for categorization of the object mask. The sub-method starts at step 412A and proceeds to step 412B.

At step 412B, a ratio of a width of the object mask (at a pre-determined height) and a height of the object mask may be determined. The image processor 202 may be configured to determine the ratio, based on the width of the object mask (at the pre-determined height) and the height of the object mask.

At step 412C, it may be determined whether the determined ratio is less than a first pre-defined value. In instances where the determined ratio is less than the first pre-defined value, the control passes to step 412F. In instances where the determined ratio is equal to or greater than the first pre-defined value, the control passes to step 412D.

At step 412D, a count of extremities of the object mask may be determined. The image processor 202 may be configured to determine the count of extremities of the object mask, based on a count of connected regions at the pre-determined height of the object mask.

At step 412E, it may be determined whether the count of the extremities is equal to or greater than a second pre-defined value. In an instance where the count of the extremities is equal to or greater than the second pre-defined value, the control passes to step 412F. In an instance where the count of the extremities is less than the second pre-defined value, the control passes to step 412G.

At step 412F, the object mask may be categorized into the second category. The image processor 202 may be configured to categorize the object mask into the second category when the determined ratio is less than the first pre-defined value. In accordance with an embodiment, the image processor 202 may be configured to categorize the object mask into the second category when the determined ratio is equal to or greater than the first pre-defined value and the count of extremities is equal to or greater than the second pre-defined value.

At step 412G, the object mask may be categorized into the first category. The image processor 202 may be configured to categorize the object mask into the first category when the determined ratio is equal to or greater than the first pre-defined value and the count of extremities is less than the second pre-defined value. At step 412H, control passes back to step 414 (FIG. 4A).

At step 414, a shadow of the embedded object in the target image may be generated. The image processor 202 may generate the shadow of the object embedded in the target image based on the categorization of the embedded object. At step 416, the generated shadow of the object in the target image may be displayed. The image processor 202 may be configured to display the generated shadow of the object in the target image on the display screen 110. Control passes to end step 418.

In accordance with an embodiment of the disclosure, the image-processing device 102 (FIG. 1) may be configured to generate shadows of an object embedded in a target image. The image-processing device 102 may comprise one or more processors, such as the image processor 202 (FIG. 2). The image processor 202 may be configured to generate an object mask of the embedded object in the target image. The image processor 202 may be further configured to categorize the object mask into a first category or a second category based on a pre-determined set of rules. Based on the categorization, the image processor 202 may be configured to generate a shadow of the object in the target image. The generation of the shadow may comprise dilating the categorized object mask by a predetermined multiplication factor when the categorized object mask corresponds to the first category. The generation of the shadow may comprise determination of depth information of the categorized object mask at a pre-determined height when the categorized object mask corresponds to the second category.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process an embedded object in a target image to generate an object mask of the embedded object in the target image. The object mask may be categorized into a first category or a second category based on a pre-determined set of rules. Based on the categorization, a shadow of the object in the target image may be generated. The generation of the shadow may comprise dilating the categorized object mask by a predetermined multiplication factor when the categorized object mask corresponds to the first category. The generation of the shadow may comprise determination of depth information of the categorized object mask at a pre-determined height when the categorized object mask corresponds to the second category.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embodied in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments falling within the scope of the appended claims.

What is claimed is:

1. An apparatus for shadow generation of one or more embedded objects, said apparatus comprising:
    one or more circuits being configured to:
        generate an object mask of an object in a target image;
        categorize said object mask into a first category or a second category based on a pre-determined set of rules; and
        generate a shadow of said object in said target image based on said categorization of said object mask,
            wherein said generation of said shadow comprises dilating said categorized said object mask by a predetermined multiplication factor when said categorized said object mask corresponds to said first category, and
            wherein said generation of said shadow comprises determination of depth information of said categorized said object mask at a pre-determined height when said categorized said object mask corresponds to said second category.

2. The apparatus according to claim 1, wherein said one or more circuits are configured to extract said object from a source image.

3. The apparatus according to claim 2, wherein said one or more circuits are further configured to embed said extracted said object at a pre-determined location in said target image.

4. The apparatus according to claim 1, wherein said first category corresponds to a category that comprises sitting objects.

5. The apparatus according to claim 1, wherein said second category corresponds to a category that comprises standing objects.

6. The apparatus according to claim 1, wherein said one or more circuits are further configured to determine a count of extremities of said object mask based on a count of connected regions at said pre-determined height of said object mask.

7. The apparatus according to claim 6, wherein said object mask is categorized into said first category when a ratio of a width of said object mask at said pre-determined height to a height of said object mask is equal to or greater than a first pre-defined value and said count of extremities of said object mask at said pre-determined height is less than a second pre-defined value.

8. The apparatus according to claim 6, wherein said object mask is categorized into said second category when a ratio of a width of said object mask at said pre-determined height to a height of said object mask is equal to or greater than a first pre-defined value and said count of extremities of said object mask at said pre-determined height is equal to or greater than a second pre-defined value.

9. The apparatus according to claim 1, wherein said object mask is categorized into said second category when a ratio of a width of said object mask at said pre-determined height to a height of said object mask is less than a first pre-defined value.

10. The apparatus according to claim 1, wherein said one or more circuits are configured to determine said pre-determined set of rules based on a ratio of a width of said object mask at said pre-determined height and a height of said object mask, and/or a count of extremities of said object mask.

11. The apparatus according to claim 1, wherein said one or more circuits are configured to generate said shadow of said object in said target image based on an ambient source of light.

12. An apparatus for shadow generation of one or more embedded sitting objects, said apparatus comprising:
    one or more circuits being configured to:
        generate an object mask of an object in a target image, wherein said object is categorized as a sitting object;
        determine a bottom contour of said object mask between a left-most contour point and a right-most contour point;
        dilate said determined said bottom contour by a pre-determined multiplication factor; and
        generate a shadow of said object in said target image based on said dilation.

13. The apparatus according to claim 12, wherein said object is categorized as said sitting object when a ratio of a width at a pre-determined height and a height of said object mask is equal to or greater than a first pre-defined value and a count of extremities of said object mask at a pre-determined height is less than a second pre-defined value.

14. The apparatus according to claim 12, wherein said one or more circuits are further configured to generate a contour of said object mask.

15. The apparatus according to claim 14, wherein said one or more circuits are configured to determine said dilated bottom contour between vertical planes at said left-most contour point and said right-most contour point of said determined bottom contour.

16. The apparatus according to claim 15, wherein said one or more circuits are further configured to control a brightness of said generated shadow based on a distance of each pixel in said dilated bottom contour from said determined bottom contour of said object mask.

17. An apparatus for shadow generation of one or more embedded standing objects, said apparatus comprising:
    one or more circuits being configured to:
        generate an object mask of an object in a target image, wherein said object is categorized as a standing object;
        determine depth information at each height of said object mask based on an elliptical shape with a pre-determined horizontal cross-sectional length and a pre-determined vertical cross-sectional length; and generate a shadow of said object in said target image based on said determined depth information at a pre-determined height.

18. The apparatus according to claim 17, wherein said object is categorized as said standing object when a ratio of a width at a pre-determined height and a height of said object mask is less than a first pre-defined value.

19. The apparatus according to claim 17, wherein said object is categorized as said standing object when a ratio of a width at said pre-determined height and a height of said object mask is equal to or greater than a first pre-defined value and a count of extremities of said object mask at said pre-determined height is equal to or greater than a second pre-defined value.

20. The apparatus according to claim 17, wherein said one or more circuits are configured to generate said shadow of said object in said target image based on an ambient source of light.

21. The apparatus according to claim 20, wherein said ambient source of light comprises a plurality of point light sources, wherein said plurality of point light sources are positioned in a circular pattern at a plane parallel to a ground plane associated with said target image, such that azimuthal angles of said plurality of point light sources are equal.

22. The apparatus according to claim 21, wherein said generated shadow of said object includes a plurality of shadows of said object generated by said plurality of point light sources.

23. The apparatus according to claim 17, wherein said generated shadow of said object further includes a shadow corresponding to a cross-sectional area of extremities of said object mask at said pre-determined height.

* * * * *